(12) United States Patent
Chamarthy

(10) Patent No.: US 9,087,140 B2
(45) Date of Patent: Jul. 21, 2015

(54) SELF-PARSING XML DOCUMENTS TO IMPROVE XML PROCESSING

(75) Inventor: Ravi Chandra Chamarthy, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 549 days.

(21) Appl. No.: 13/114,339

(22) Filed: May 24, 2011

(65) Prior Publication Data

US 2012/0303640 A1 Nov. 29, 2012

(51) Int. Cl.
G06F 17/30 (2006.01)
G06F 17/27 (2006.01)

(52) U.S. Cl.
CPC ........ *G06F 17/30943* (2013.01); *G06F 17/272* (2013.01); *G06F 17/30911* (2013.01)

(58) Field of Classification Search
CPC .......................... G06F 17/272; G06F 17/30943
USPC .................................................. 707/755, 736
See application file for complete search history.

(56) References Cited

U.S. PATENT DOCUMENTS

| | | | |
|---|---|---|---|
| 7,716,576 B1 | 5/2010 | Le et al. | |
| 2005/0015797 A1* | 1/2005 | Noblecourt et al. | 725/32 |
| 2005/0097455 A1 | 5/2005 | Zhou et al. | |
| 2007/0299811 A1 | 12/2007 | Chandrasekar et al. | |
| 2008/0033974 A1 | 2/2008 | Cameron | |
| 2008/0040368 A1* | 2/2008 | Li et al. | 707/101 |
| 2008/0040657 A1 | 2/2008 | Kuznetsov et al. | |
| 2008/0059511 A1 | 3/2008 | Summers et al. | |
| 2008/0244586 A1 | 10/2008 | Hopp | |
| 2009/0006944 A1 | 1/2009 | Dang et al. | |
| 2009/0089658 A1* | 4/2009 | Chiu et al. | 715/234 |
| 2009/0327861 A1 | 12/2009 | Coulson et al. | |
| 2010/0180195 A1 | 7/2010 | Behrens et al. | |

FOREIGN PATENT DOCUMENTS

JP 2003-0131931 5/2003

OTHER PUBLICATIONS

Bhide et al. "XPEDIA: XML Processing for Data Integration", VLDB'09, Aug. 24-28, 2009, Lyon. France 12 pages.
Lu et al. "A Paraiiel Approach to XML Parsing", 8 pages.
Belokosztoiszki et al. "An XML based framework for self-describing parallel I/O data", Proceedings of the Eleventh Euromicro Conference on Parallel, Distributed and Network-Based Processing, 2003 IEEE, 8 pages.
"How to Parse Huge XML Files?", PrlMnks.org, May 31, 2006, 4 pages.

(Continued)

*Primary Examiner* — Huawen Peng
(74) *Attorney, Agent, or Firm* — Susan Murray; Edell, Shapiro & Finnan, LLC

(57) ABSTRACT

A method, computer program product, and system for pre-parsing a large XML document to enable faster processing, comprising providing an XML document that is idle or is being generated, pre-parsing the XML document to generate one or more indices associated with the XML document, storing the indices in the XML document, and storing the XML document in a storage area. At the time of processing the XML document, an XML consumer is able to process the XML document more quickly than normal by using the one or more indices.

13 Claims, 7 Drawing Sheets

(56) References Cited

OTHER PUBLICATIONS

Rick Jelliffe "Parallel parsing XML documents: applicable to interactive editors too?", www.oreillynet.com, May 26, 2008, 2 pages.

"Parallel XML Document Parsing with Muiti-core Processors", www.cisco.com, 1 page.

Zinn et al. "Parallelizing XML Processing Pipelines via MapReduce" 12 pages.

Lu et al. "ParaXML : A Parallel XML Processing Model on the Multicore CPUs", 13 pages.

Jeorig et al. "Service-cenfric Object Fragmentation for Efficient Retrieval and Management of Huge XML Documents", IEEE 2007, 7 pages.

Wei Lu et al. "Parallel XML Processing by Work Stealing" SOCP '07, Jun. 26, 2007, Monterey, California, USA, 7 pages.

Yu Wu et al. "A Hybrid Parallel Processing for XML Parsing and Schema Validation", Presented at Balisage: The Markup Conference 2008, Montreal, Canada, Aug. 12-15, 2008. In proceedings of Balisage: The Markup Conference 2008. BalisSeries on Markup Technologies, vol. 1 (2008).

Adobe Systems Incorporated, "XMP Adding Intelligence to Media", XMP Specification, Adobe, Sep. 2005; Corporate Headquarters 345 Park Avenue, San Jose, CA 95110-2704, Copyright 2000-2005.

Wei Lu et al, "Parallel XML Processing by Work Stealing", Indiana University, Slides from SOCP '07 Conference, Jun. 26. 2007, Monterey, California, USA.

Pan et al. "Parallel XML Parsing Using Meta-DFAs", Third IEEE International Conference on e-Science and Grid Computing (e-Science 2007), Bangalore, India, Dec. 10-13, 2007, 1 page.

Lu et al. "A Parallel Approach to XML Parsing", (2006), 8 pages.

"Parallel XML Document Parsing with Multi-core Processors", www.cisco.com/web/about/ac50/ac207/crc_new/university/RFP/rfp07018.html, (2008), 1 page.

Zinn et al. "Parallelizing XML Processing Pipelines via MapReduce", (2009) 12 pages.

Lu et al. "ParaXML: A Parallel XML Processing Model on the Multicore CPUs", (2008), 13 pages.

\* cited by examiner

SELF-PARSING XML DOCUMENTS TO IMPROVE XML PROCESSING

BACKGROUND

1. Technical Field

The present invention relates generally to XML processing, and more particularly to self-parsing XML documents in order to improve XML document processing.

2. Discussion of Related Art

The eXtensible Markup Language (XML) is widely used in web services, messaging systems, databases, and document processing. XML provides a powerful and flexible tool for data exchange, and because XML documents are text-based they are relatively easy to read and thus use. However, XML documents are relatively verbose and large (e.g., file sizes greater than one gigabyte), and thus the processing of XML documents is often a performance bottleneck in computer systems and applications. Proposed solutions to these processing problems include upgraded hardware (e.g., faster processors) and software optimizations such as efficient parsers and file compression, however each of these attempted solutions has shortcomings. Streaming XML parsing is sometimes used to process large XML documents, however streaming parsers are generally limited in power and flexibility compared to other parsers (such as tree-based parsers) and provide only a limited view of the infoset state at one location at a time in the XML document.

BRIEF SUMMARY

Accordingly, embodiments of the present invention include a method, computer program product and a system for pre-parsing a large XML document to enable faster processing, comprising providing an XML document that is not being parsed or executed, pre-parsing the XML document to generate an index associated with the XML document, wherein the index is capable of being used by an XML consumer to process the XML document, storing the index in the XML document, and storing the XML document in a storage area.

The above and still further features and advantages of embodiments of the present invention will become apparent upon consideration of the following detailed description thereof, particularly when taken in conjunction with the accompanying drawings wherein like reference numerals in the various figures are utilized to designate like components.

DETAILED DESCRIPTION

The present embodiments provide self-parsing XML documents that exhibit improved XML processing. For example, an XML document is pre-parsed to create one or more indices associated with the XML document, either at the time of document creation, or at a later time when the XML document is idle, e.g., stored in a database or file system and not being used. The indices may be stored inside the XML document, or separately from it. When it is time for an XML consumer to process the XML document, the XML consumer uses the index (or indices) associated with the XML document to assist in the processing, thus significantly reducing the time and resources needed to parse the XML document, while enhancing user response time. The present embodiments thus provide significant performance improvements, particularly if the XML documents are large (e.g., file sizes greater than one gigabyte).

Figure 1:
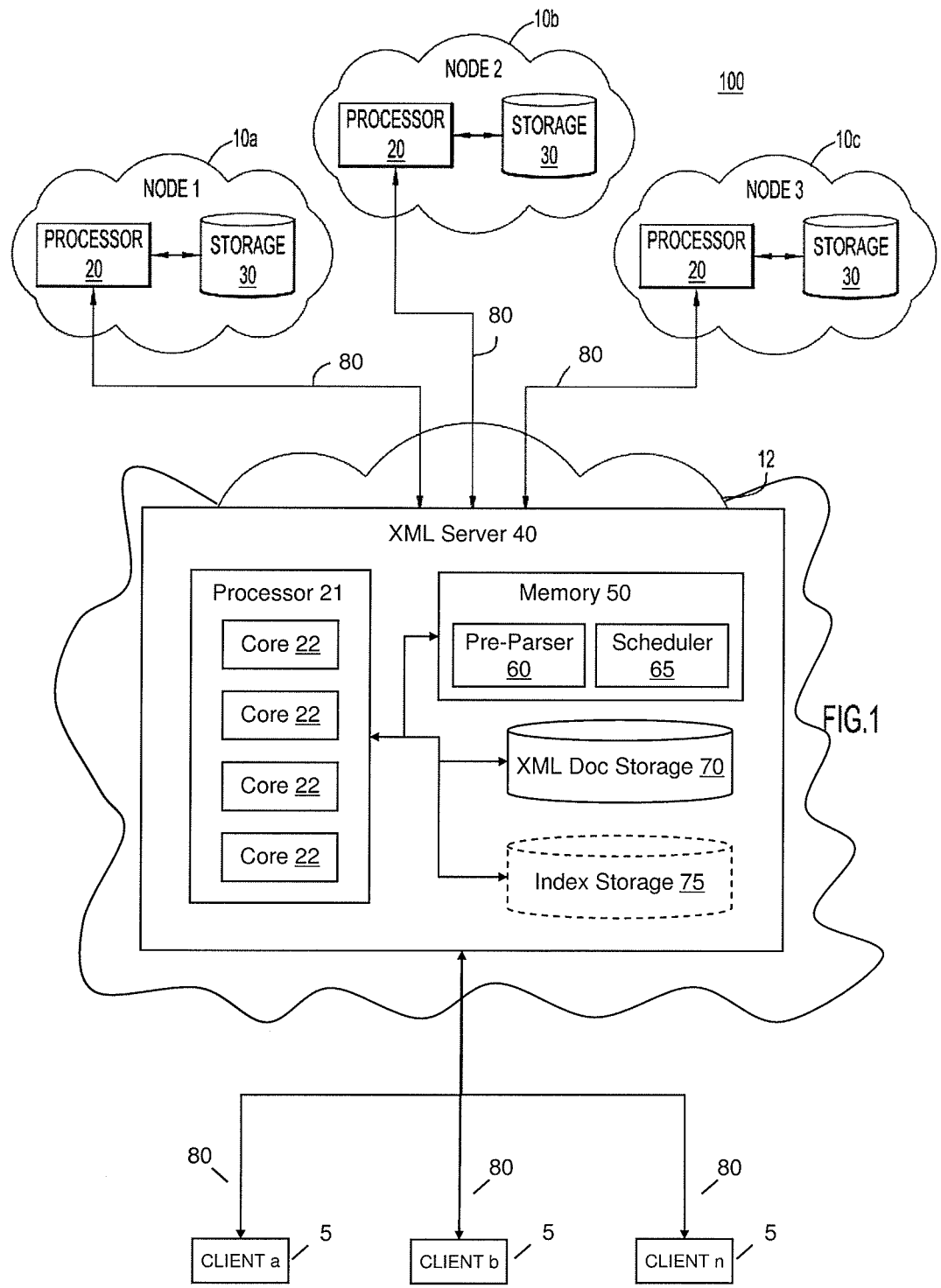
FIG. 1 is a block diagram illustrating a computer system having multiple processors according to an embodiment of the present invention.

Referring now to the Figures, an exemplary computer system 100 according to embodiments of the present invention is illustrated in FIG. 1. The exemplary computer system 100 comprises multiple processing nodes 10, 12, each of which is capable of independently processing an XML document or a portion thereof. The system 100 may be a client-server system, database system, virtual desktop system, distributed computer system, cloud-based system, clustered database, data center, storage area network (SAN), or in any other suitable system, for example in a system designed for the provision of Software-as-a-Service (SaaS), such as a cloud data center or hosted web service.

The depicted system 100 further comprises one or more user clients 5, which allow a user to interface with the system, for example by entering data into the system, retrieving an XML document, or querying a database. Although user clients 5 are shown as interacting with XML server node 12, it is understood that user clients 5 may interact with multiple nodes 10, 12, and that any node 10, 12 may act as the server or coordinator for a particular application or process. ient devices 5, which are described further with respect to FIG. 2, may be any conventional or other computer system or device, such as a thin client, computer terminal or workstation, personal desktop computer, laptop or netbook, tablet, cellular phone, networked television, or other device capable of acting as a client in the described system.

Each of the processing nodes 10a, 10b, 10c comprises a processor 20 and storage area 30, where, for example, XML documents or other data objects may be stored. Processing node 12 comprises an XML server 40, which comprises a multi-core processor 21 having four cores 22. Although the processing nodes 10 are shown as each having one processor 20, it should be understood that each node may comprise multiple processing partitions, each of which may comprise multiple processors. XML server 40 also comprises memory 50 having a pre-parser 60 and scheduler 65 resident therein, XML document storage area 70, and may also comprise index storage area 75, depending on whether indices are stored with their associated XML documents or not in a particular implementation of the present embodiments.

Processors 20, 21 are, for example, data processing devices such as microprocessors, microcontrollers, systems on a chip (SOCs), or other fixed or programmable logic, that executes instructions for process logic stored in respective memory (not shown). Each processor 20, 21 may be a multi-processor, and have multiple CPUs, multiple cores, multiple dies comprising multiple processors, etc. Because the XML processing in system 100 may be divided among the multiple nodes 10, multiple processors 20, 21 may be used to satisfy requests for information, e.g., data retrieval or update requests.

Storage areas 30, memory 50, XML document storage area 70, and index storage area 75 may be implemented by any quantity of any type of conventional or other memory or storage device, and may be volatile (e.g., RAM, cache, flash, etc.), or non-volatile (e.g., ROM, hard-disk, optical storage, etc.), and include any suitable storage capacity. Each storage area 30, 70, 75 may be, for example, one or more databases implemented on a solid state drive or in a RAM cloud. Storage areas 70, 75 and memory 50, may be part of one virtual address space spanning multiple primary and secondary storage devices, as may collective storage areas 30. Data in the system 100 (e.g., documents, files, emails, tables, indexes, etc.) is stored in the storage areas 30, for example a particular database table may be stored in multiple storage areas 30 on one or more nodes 10.

User clients 5, nodes 10, 12, processors 20, 21, pre-parser 60 and scheduler 65 may each be implemented in the form of a processing system, or may be in the form of software. They can each be implemented by any quantity of conventional or other computer systems or devices (e.g., computer terminals, personal computers of all types (e.g., including tablets, laptops, netbooks, etc.), or cellular telephones/personal data assistants of all types, and may include any commercially available operating systems for all types of computer hardware and any commercially available or custom software (e.g., browser software, communications software, word processing software, etc.). These systems may include processors, memories (e.g., RAM, cache, flash, ROM, solid-state, hard-disk, etc.), internal or external communications devices (e.g., modem, network adapter, etc.), I/O interfaces, output devices (e.g., displays, printers, etc.), and input devices (e.g., physical keyboard, touch screen, mouse, trackpad, microphone for voice recognition, etc.). If embodied in software (e.g., as a virtual image), they may be available on a recordable medium (e.g., magnetic, optical, floppy, DVD, CD, other non-transitory medium, etc.) or in the form of a carrier wave or signal for downloading from a source via a communication medium (e.g., bulletin board, network, LAN, WAN, Intranet, Internet, mobile wireless, etc.).

It is understood that any of the various components of the system 100 may be local to one another, or may be remote from and in communication with one or more other components via any suitable communication means or devices 80, for example a network such as a WAN, a LAN, Internet, Intranet, mobile wireless, etc. In one embodiment, the processing nodes 10, 12 and user clients 5 are communicatively connected to each other, for example, via network connections 80, which represent any hardware and/or software configured to communicate information via any suitable communications media (e.g., WAN, LAN, Internet, Intranet, wired, wireless, etc.), and may include routers, hubs, switches, gateways, or any other suitable components in any suitable form or arrangement.

The computer system 100 may include additional servers, clients, and other devices not shown, and individual components of the system may occur either singly or in multiples. For example, there may be more than four nodes 10, 12 in the system, more than one multi-core processor 21 in the system, more than four cores 22 in the multi-core processor 21, and any of the processors 20, 21 may themselves be multi-processors, and have multiple CPUs, multiple cores, multiple dies comprising multiple processors, etc. Also for example, there may be more than one XML server 40 in the system, the XML server 40 may have a single core processor 20 instead of the depicted multi-core processor 21, or for example, the functionality of various components (e.g., pre-parser 60 and scheduler 65) may be combined into a single device or split among multiple devices.

Figure 2:
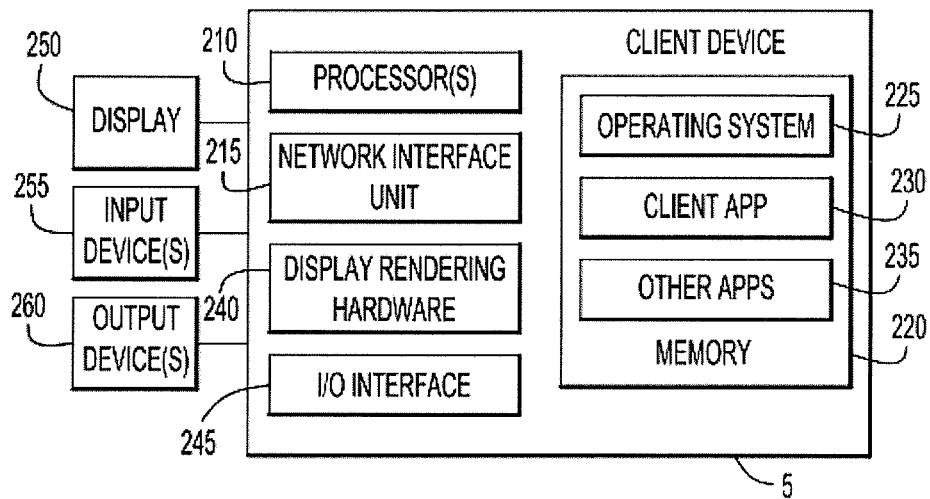
FIG. 2 is a block diagram illustrating a client device that may be used in the computer systems of the present invention.

Referring to FIG. 2, an example of a client device 5 that may be used in system 100 is depicted. ient device 5 comprises one or more processors 210, a network interface unit 215, memory 220, display rendering hardware 240, and input/output interface 245. Resident in memory 220 are operating system 225, XML client application 230, and optionally other applications 235. The client application 230 provides an interface such as a graphical user interface (GUI) for a user of the client device 5 to interact with the XML server 40. Processor 210 is, for example, a data processing device such as a microprocessor, microcontroller, system on a chip (SOCs), or other fixed or programmable logic, that executes instructions for process logic stored in memory 220. Network interface unit 215 enables communication to the computer system 100. Memory 220 may be implemented by any quantity of any type of conventional or other memory or storage device, and may be volatile (e.g., RAM, cache, flash, etc.), or non-volatile (e.g., ROM, hard-disk, optical storage, etc.), and include any suitable storage capacity. Display rendering hardware 240 may be a part of processor 210, or may be, e.g., a separate Graphics Processor Unit (GPU).

I/O interface 245 enables communication between display device 250, input device(s) 260, and output device(s) 270, and the other components of client device 5, and may enable communication with these devices in any suitable fashion, e.g., via a wired or wireless connection. The display device 250 may be any suitable display, screen or monitor capable of displaying information to a user of a client device 5, for example the screen of a tablet or the monitor attached to a computer workstation. Input device(s) 260 may include any suitable input device, for example, a keyboard, mouse, trackpad, touch input tablet, touch screen, camera, microphone, remote control, speech synthesizer, or the like. Output device(s) 270 may include any suitable output device, for example, a speaker, headphone, sound output port, or the like. The display device 250, input device(s) 260 and output device(s) 270 may be separate devices, e.g., a monitor used in conjunction with a microphone and speakers, or may be combined, e.g., a touchscreen that is a display and an input device, or a headset that is both an input (e.g., via the microphone) and output (e.g., via the speakers) device.

FIGS. 3-4 and 8-9 depict various processes for generating indices associated with XML documents and using the indices to improve the processing of XML documents, according to various embodiments of the present invention. Although each of these Figures and the accompanying descriptions refer to a single XML document, it is understood that the present embodiments are not so limited, and that the processes are performed on multiple XML documents in system 100 at the same or different times. For example, the various processes may run concurrently or sequentially, may be scheduled to run at periodic intervals or may be run on demand, or may run at any time and in any combination desired for a particular implementation.

Figure 3:
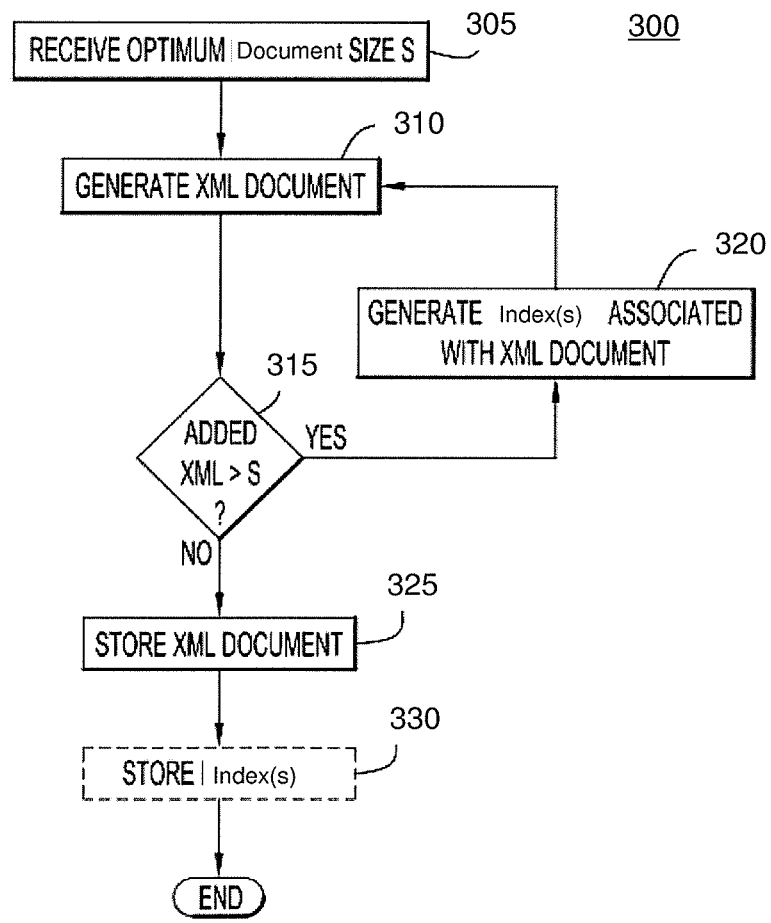
FIG. 3 is a flowchart depicting a process for generating an XML document and an associated XML index, according to an embodiment of the present invention.

Referring now to FIG. 3, reference numeral 300 generally designates a flow chart depicting an exemplary generation of an index associated with an XML document, according to an embodiment of the present invention. This process 300 may be carried out by any suitable server, client or other device capable of generating or producing an XML document (herein called the "generator"), and may be carried out by, e.g., the multi-core processor 21 or pre-parser 60 of FIG. 1, one of the processors 20 of FIG. 1, or any other device, etc.

In step 305, the generator receives or is provided with optimum XML document processing parameters, which comprise an optimum document size S of the XML document. This size S is determined (e.g., predetermined) in any suitable fashion by any suitable component of system 100, and may be, e.g., an optimum partition size, an optimum document size for a parallel processor, an optimum size based on the average processing capacity of the processors present in a particular system, etc. The generator does not need to know any details about the number or type of the eventual consumers of the XML document (the "XML consumers"), and may operate with a general directive such as an optimum document size S of, e.g., 1 gigabyte (GB). The optimum document size S may be any suitable size, and may be, e.g., one gigabyte, five gigabytes, ten gigabytes, 100 gigabytes, etc. For ease of description, the present embodiments will be described with reference to an optimum document size S of one gigabyte, however it is understood that the present embodiments are not limited to this size.

In step 310, the generator begins to generate the XML document, and keeps track of the size of the XML document as it is generated. In step 315, the generator determines if the XML data added to the XML document is greater than size S, and if not, proceeds to step 325 and stores the XML document without generating an index at this time. If yes, then the generator in step 320 generates one or more indices associated with the XML document, for example by pre-parsing the XML document, cycles back to step 310 to continue generating the XML document, and then again in step 315 determines if the added XML data is greater than S. The one or more indices may be stored with or in the associated XML document or separately from it, as shown by optional step 330. If stored separately, then the indices are retrieved from a storage repository when it is time to process the XML document. After step 325 (or step 330 if present), the process 300 ends with respect to this XML document.

Figure 4:
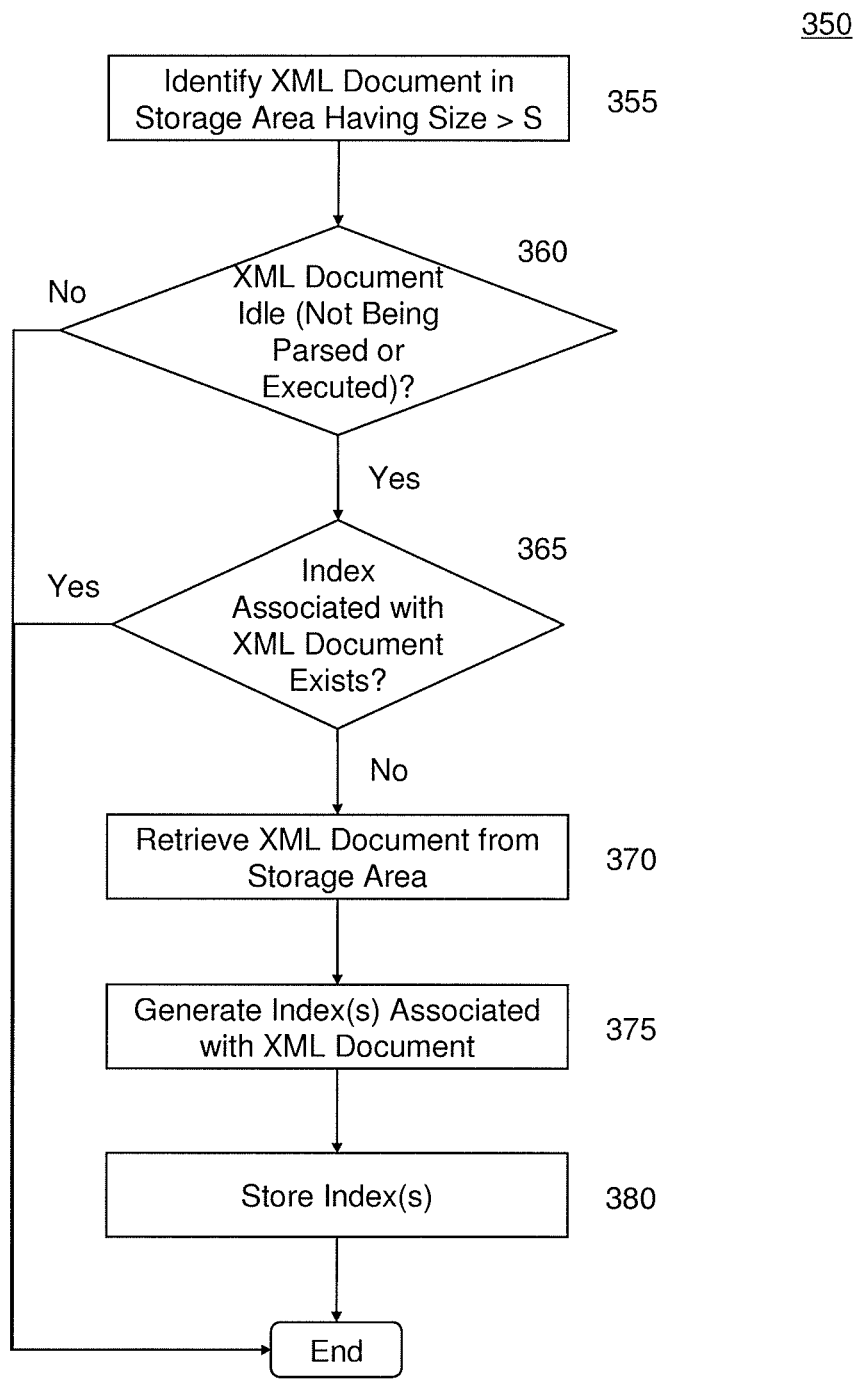
FIG. 4 is a flowchart depicting a process for generating an XML index associated with an already existing XML document, according to an embodiment of the present invention.

Referring now to FIG. 4, reference numeral 350 generally designates a flow chart depicting a process for generating an XML index associated with an already existing XML document, according to an embodiment of the present invention. This process 350 may be carried out by a generator such as described with respect to FIG. 3, or may be carried out, e.g., by the pre-parser 60. Although the process 350 is described below with reference to the pre-parser 60, it is understood that this is the description of a particular embodiment, and in other embodiments a different generator may carry out process 350.

Process 350 may be initiated in any suitable manner, for example by an XML consumer being instantiated, by the generation of an XML document, by the receipt of a request from a particular application or system module communicating with XML server 40, etc. In one embodiment, the scheduler 65 instructs the pre-parser 60 to perform the process 350, for example because a predetermined time interval has passed, a certain threshold of XML consumer activity has been passed, or the like.

In step 355, the pre-parser identifies a stored XML document that has a size greater than optimum document size S. The XML document may be stored in any suitable storage area, e.g., storage area 30. In step 360, the pre-parser determines if the XML document is idle, e.g., is not being parsed, executed or otherwise used at this point in time. If yes, the pre-parser proceeds to step 365, but if not idle, then the process 350 ends (for this XML document). In step 365, the pre-parser determines if the XML document already has an associated index, and if yes, then the process 350 ends (for this XML document). If not, then in step 370, the pre-parser retrieves the XML document from the storage area, and then in step 375 generates one or more indices associated with the XML document, for example by pre-parsing the XML document, and then in step 380 stores the indices, either in the XML document, or separately from the XML document in, e.g., XML document storage 70 or index storage area 75. After step 380, the process 350 ends with respect to this XML document.

Figure 5:
FIG. 5 is a block diagram depicting a portion of an XML document before and after its associated XML index has been generated, according to an embodiment of the present invention.

Referring now to FIG. 5, a portion of an example XML document is depicted before (item 405a) and after (item 405b) its associated XML index has been generated, according to an embodiment of the present invention. In the depicted embodiment, the index is stored in the XML document, e.g., inside a character data (CDATA) section 410 such as a CDATA section at the start of the document (e.g., after the start tag or the root node), or it may be embedded in a specialized tag such as "<MDATA>" that may be, e.g., present at the head of the XML document so that it is easily fetched by an XML consumer. XML consumers that utilize the present embodiments are able to find and utilize the indices, while other XML consumers may safely ignore the index information, e.g., by treating it as any other comment. If there is more than one index associated with a particular XML document, then one or more of the indices may be stored in the XML document, and one or more other indices may be stored separately from the XML document, or all indices may be stored in the same place (e.g., in the XML document).

Figure 6:
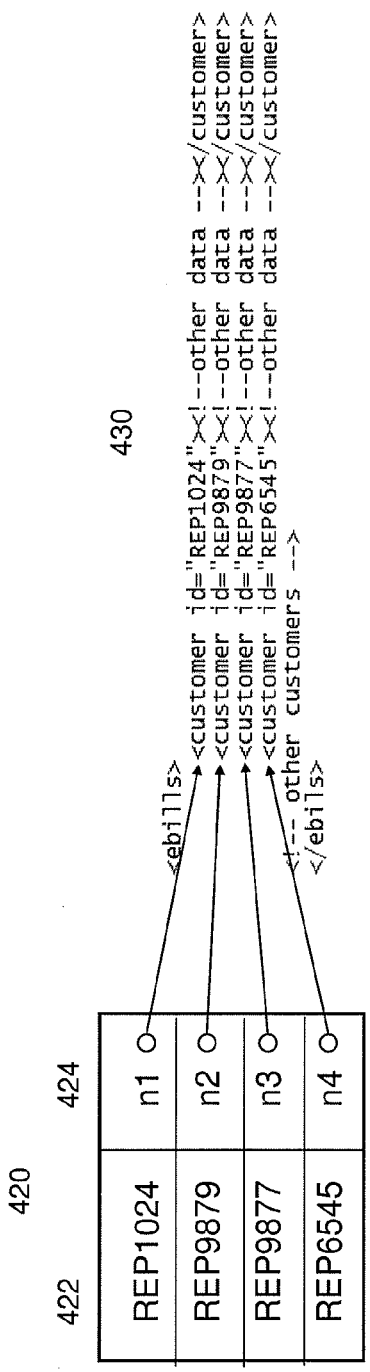
FIGS. 6 and 7 are block diagrams depicting alternative indices that may be associated with an XML document, according to alternative embodiments of the present invention.
Figure 7:
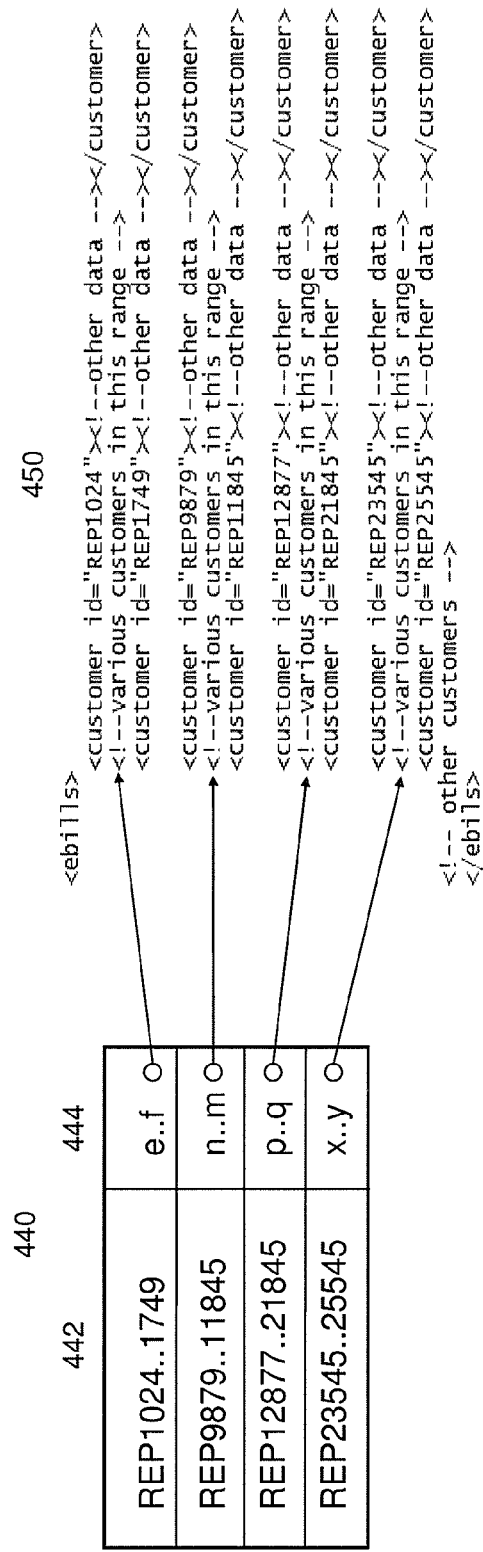

Referring now to FIGS. 6 and 7, alternative indices that may be associated with an XML document, according to alternative embodiments of the present invention are shown. FIG. 6 depicts a logical representation 420 of the association of the generated index 422 and the XML node 424 in the sample XML document 430. FIG. 7 depicts a logical representation 440 of the association of generated XML index ranges 442 for the corresponding XML nodes 444 in sample XML document 450.

The index may comprise information such as unique keys within an XML node, key ranges for a set of XML nodes, etc. For example, the index may include information such as "first GB of XML data is about attributes x, y; second GB of XML data is about attributes m, n; etc.". The index may comprise the start and end location of each CDATA section in the XML document, size information (e.g., average, minimum, maximum, etc.) of sub-trees rooted at different positions in the XML document, etc. The index may also comprise set information about the XML document, for example, one or more of the following: the start location of the sub-tree rooted immediately below the root node (or some other node of interest) in the XML document; the XPath of the root of this sub-tree; and the number of sub-tree information present in the set. The sub-trees are selected such that they divide the XML document into approximately equal sub-divisions. For example, the index may comprise the start locations of one or more nodes that are evenly spaced throughout the XML document.

Figure 8:
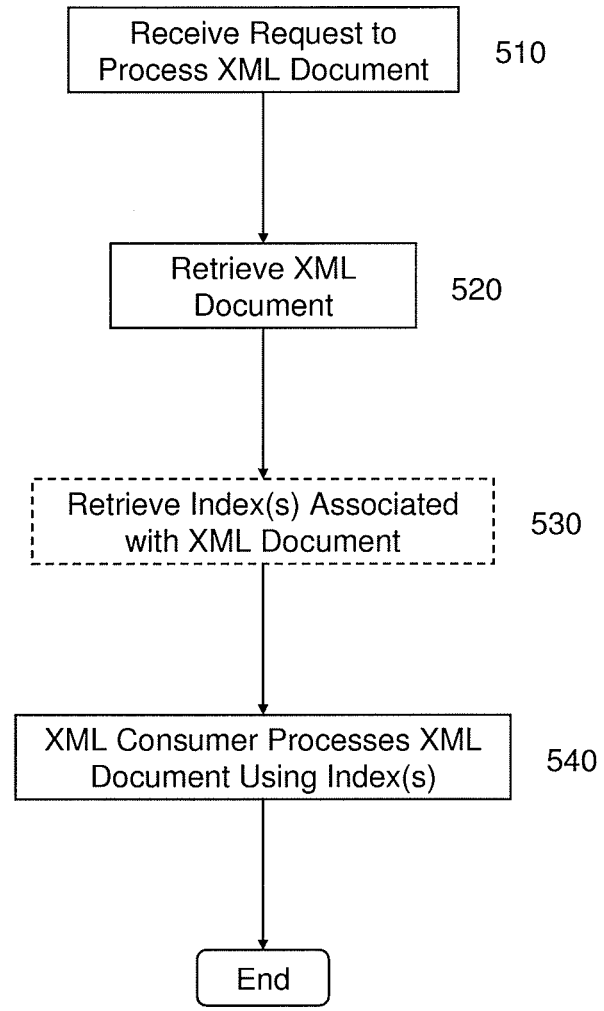
FIG. 8 is a flowchart depicting a process for processing an XML document using an index associated with the XML document, according to an embodiment of the present invention.

Referring now to FIG. 8, reference numeral 500 generally designates a flow chart depicting the processing of an XML document using an index associated with an XML document, according to an embodiment of the present invention. This process 500 may be carried out by any suitable server, client or other device capable of processing an XML document (herein called the "system"), and may be carried out by, e.g., the XML server 40, multi-core processor 21 or pre-parser 60 of FIG. 1, one of the processors 20 of FIG. 1, an XML consumer, or any other device, etc. In one embodiment, the process 500 is carried out by an XML consumer.

In step 510, the system receives a request to process an XML document, and in step 520 retrieves the XML document, for example from XML document storage area 70, or as input from another device, or in any other suitable fashion. If necessary (e.g., the index is not stored inside the XML document), the system in step 530 retrieves the index or indices associated with the XML document, for example from index storage area 75, or from any other suitable source. In step 540, the system analyzes the index or indexes and uses the information therein to process the XML document. The process 500 then ends with respect to this XML document.

Figure 9:
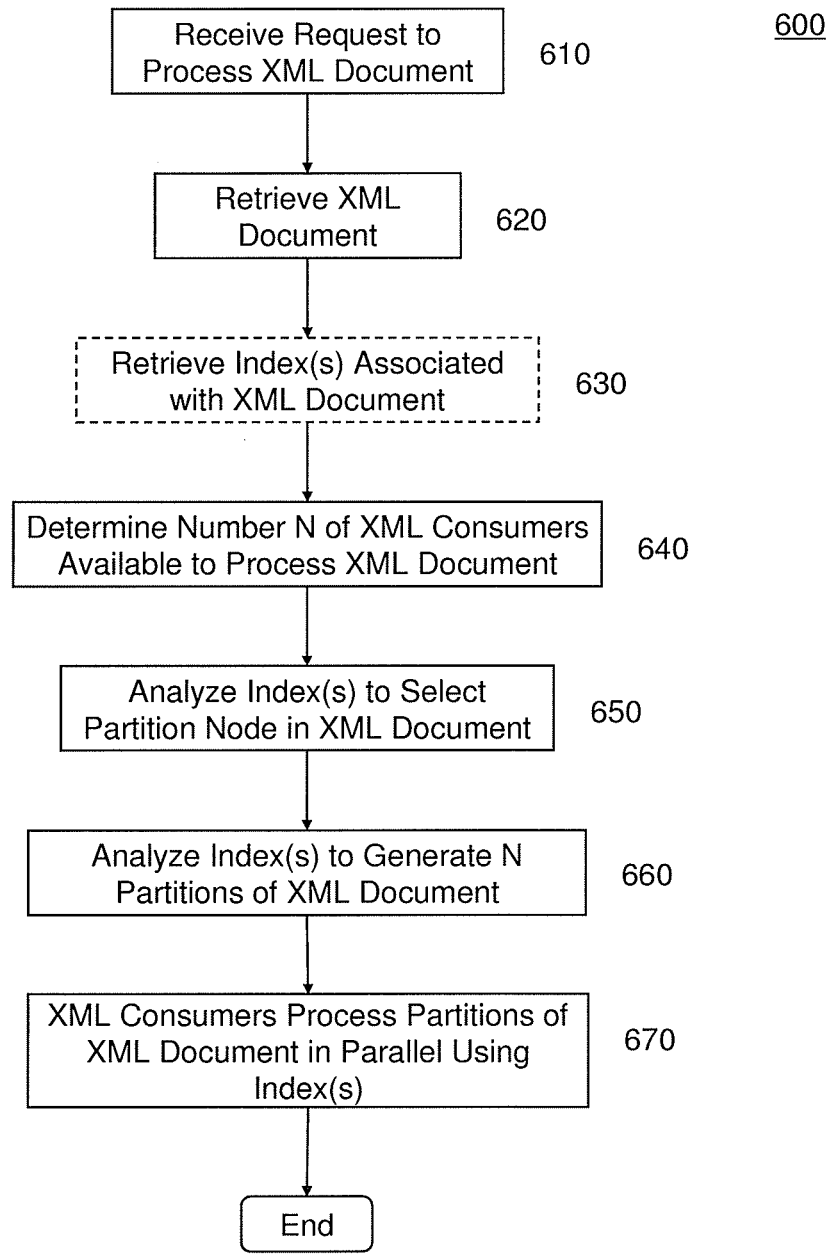
FIG. 9 is a flowchart depicting a process for parallel processing an XML document using an index associated with the XML document, according to an embodiment of the present invention.

Referring now to FIG. 9, reference numeral 600 generally designates a flow chart depicting the parallel processing of an XML document using an index associated with an XML document, according to an embodiment of the present invention. This process 600 may be carried out by any suitable server, client or other device capable of processing an XML document (herein called the "system"), and may be carried out by, e.g., the XML server 40, multi-core processor 21 or pre-parser 60 of FIG. 1, one of the processors 20 of FIG. 1, an XML consumer, or any other device, etc. In one embodiment, the process 600 is carried out by the XML server 40.

In step 610, the system receives a request to process an XML document, and in step 620 retrieves the XML document, for example from XML document storage area 70, or as input from another device, or in any other suitable fashion. If necessary (e.g., the index is not stored inside the XML document), the system in step 630 retrieves the index or indices associated with the XML document, for example from index storage area 75, or from any other suitable source. In step 640 the system determines the number N of XML consumers available to process the XML document. In step 650, the system analyzes the index or indices, and uses the information therein to select a partition node, e.g., \customers\customer, and in step 660 generates N partitions, which in step 670 are processed in parallel by the XML consumers. The process 600 then ends with respect to this XML document.

An XML consumer may be hardware (e.g., a server, client, processor, or other device) or software (e.g., an application, task, thread or portion thereof) that independently consumes or processes XML, e.g., accepts an XML object as input. For example, an Extract, Transform, Load (ETL) process that extracts data from XML documents for storage in a database (e.g., the IBM WebSphere® DataStage™ XML pack; WebSphere® and DataStage™ are trademarks of International Business Machines Corporation) may be considered an XML consumer. Also for example, in the exemplary system of FIG. 1, each node 10, 12 or each processor 20, 21 may be considered as an XML consumer, because each node is capable of independently processing XML documents. Or, for example, the multi-core processor 21 may be considered as comprising four XML consumers (the cores 22) because each core is capable of independently processing XML documents.

The XML consumer may comprise a parser, which may be any suitable parser capable of processing XML documents according to the present embodiments. The parser may comprise a custom or pre-existing Application Programming Interface (API) for XML processing. The API may be, e.g., a tree-based API such as a Document Object Model (DOM) API, an event-based parser such as a Simple API for XML (SAX) API, a stream-oriented (streaming) API such as Expat or Streaming API for XML (StAX), an API for XML data binding such as the Java Architecture for XML Binding (JAXB), or any other suitable API. The parser may comprise multiple parsing interfaces, for example the Java API for XML Processing (JAXP) comprises a DOM interface, a SAX interface, and a StAX interface, and the Microsoft XML Core Services (MSXML) comprises DOM and SAX interfaces.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a solid state disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, a phase change memory storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, e.g., an object oriented programming language such as Java, Smalltalk, C++ or the like, or a procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It is to be understood that the software for the computer systems of the present invention embodiments may be implemented in any desired computer language and could be developed by one of ordinary skill in the computer arts based on the functional descriptions contained in the specification and flow charts illustrated in the drawings. By way of example only, the software may be implemented in the C#, C++, Python, Java, or PHP programming languages. Further, any references herein of software performing various functions generally refer to computer systems or processors performing those functions under software control.

The computer systems of the present invention embodiments may alternatively be implemented by any type of hardware and/or other processing circuitry. The various functions of the computer systems may be distributed in any manner among any quantity of software modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A processing system suitable for storing and/or executing program code may be implemented by any conventional or other computer or processing systems preferably equipped with a display or monitor, a base (e.g., including the processor, memories and/or internal or external communications devices (e.g., modem, network cards, etc.) and optional input devices (e.g., a keyboard, mouse or other input device)). The system can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the system to become coupled to other processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, method and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometime be executed in the reverse order, depending on the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product for pre-parsing a large XML document to enable faster processing, comprising:
a computer readable storage medium having computer readable program code embodied therewith, the computer readable program code comprising computer readable program code configured to:
provide an XML document that is not being parsed or executed;
determine that a document size of the XML document exceeds a predetermined document size;
pre-parse the XML document and monitor the document size to partition the XML document into a plurality of distinct portions, each portion within the predetermined document size;
generate a plurality of indices with each index corresponding to one of the distinct portions of the XML document within the predetermined document size and comprising information that characterizes content of the distinct portion, and wherein the indices are used by an XML consumer to process the XML document;
store the indices in the XML document; and
store the XML document containing the indices in a storage area.

2. The computer program product of claim 1, wherein providing the XML document comprises the computer readable program code being further configured to:
generate the XML document from input data.

3. The computer program product of claim 1, wherein providing the XML document comprises the computer readable program code being further configured to:
retrieve the XML document from a storage area.

4. The computer program product of claim 1, wherein storing the indices comprises the computer readable program code being further configured to:
store each index inside a CDATA section of the XML document.

5. The computer program product of claim 1, wherein the computer readable program code is further configured to:
in response to a request for processing the XML document, retrieve the XML document and the indices associated with the XML document; and
use the indices to process the XML document.

6. The computer program product of claim 5, wherein using the indices comprises the computer readable program code being further configured to:
determine a number N that is a number of XML consumers available to process the XML document;
analyze the indices associated with the XML document to generate N partitions of the XML document without parsing; and
process the partitions in parallel, wherein each XML consumer processes one of the partitions.

7. A system for pre-parsing large XML documents to enable faster processing, comprising:
a memory having a first XML document stored therein; and
a processor configured with logic to:
if the first XML document is idle, and if a document size of the first XML document is determined to exceed a predetermined document size, pre-parse the first XML document while monitoring the document size to partition, the first XML document into a plurality of distinct portions, each portion within the predetermined document size, and generate a plurality of indices with each index corresponding to one of the distinct portions of the first XML document within the predetermined document size and comprising information that characterizes content of the distinct portion, and wherein the indices are used by an XML consumer to process the first XML document;
store the indices in the first XML document; and
store the first XML document containing the indices in the memory.

8. The system of claim 7, wherein the processor is further configured with logic to:
in response to a request for processing the first XML document, retrieve the first XML document and the indices associated with the first XML document; and
use the indices to process the first XML document.

9. The system of claim 8, wherein the system further comprises a plurality of XML consumers, and wherein using the indices comprises the processor being further configured with logic to:
determine a number N that is a number of XML consumers available to process the first XML document;
analyze the indices associated with the first XML document to generate N partitions of the first XML document without parsing; and
process the partitions in parallel, wherein each XML consumer processes one of the partitions.

10. The system of claim 9, wherein the XML consumers are individual processors in a multi-processor system.

11. The system of claim 9, wherein the XML consumers are individual processing nodes in a distributed computer system.

12. The system of claim 7, wherein the processor is further configured with logic to:
generate a second XML document from input data;
if the second XML document is idle, and if a document size of the second XML document is determined to exceed a predetermined document size, pre-parse the second XML document while monitoring the document size to partition the second XML document into a plurality of distinct portions, each portion within the predtermined document size, and generate a plurality of indices with each index corresponding to one of the distinct portions of the second XML document within the predetermined document size and comprising information that characterizes content of the distinct portion; and wherein the indices are used by an XML consumer to process the second XML document;
store the one or more generated indices in the second XML document; and
store the second XML document in the memory.

13. The system of claim 12, wherein the processor is further configured with logic to:
in response to a request for processing the second XML document, retrieve the second XML document and the one or more indices associated with the second XML document; and
use the one or more indices associated with the second XML document to process the second XML document.

* * * * *